US005696493A

United States Patent [19]
Einck

[11] Patent Number: 5,696,493
[45] Date of Patent: Dec. 9, 1997

[54] PEDESTAL HOUSING FOR ELECTRIC CONNECTION PANEL FOR SUMP PUMP AND FULL SEPTIC TANK ALARM

[76] Inventor: Virgil A. Einck, 2913 Silver Cedar Rd., Oconomowoc, Wis. 53066

[21] Appl. No.: 556,062

[22] Filed: Nov. 9, 1995

Related U.S. Application Data

[63] Continuation-in-part of Ser. No. 433,548, May 3, 1995.
[51] Int. Cl.$^6$ .................................................. G08B 21/00
[52] U.S. Cl. .......................... 340/623; 340/618; 340/624
[58] Field of Search ...................................... 340/623, 624, 340/618; 174/50, 51, 52.1; 361/752, 756, 775; 470/14, 40, 63

[56] References Cited

U.S. PATENT DOCUMENTS

| | | | |
|---|---|---|---|
| 3,145,761 | 8/1964 | Reusch | 431/64 |
| 4,087,204 | 5/1978 | Niedermeyer | 417/2 |
| 4,228,427 | 10/1980 | Niedermeyer | 340/623 |
| 4,230,578 | 10/1980 | Culp et al. | 526/185 |
| 4,262,216 | 4/1981 | Johnston | 307/118 |
| 4,348,158 | 9/1982 | Wood | 417/40 |
| 4,369,438 | 1/1983 | Wilhelmi | 340/623 |
| 4,553,561 | 11/1985 | Morris | 137/362 |
| 4,922,234 | 5/1990 | Murphy | 340/608 |
| 5,015,152 | 5/1991 | Greene | 417/40 |
| 5,125,247 | 6/1992 | Mills | 340/624 |
| 5,256,834 | 10/1993 | Gehring | 174/37 |
| 5,283,569 | 2/1994 | Nelson | 340/623 |
| 5,568,362 | 10/1996 | Hansson | 361/736 |

*Primary Examiner*—Jeffery Hofsass
*Assistant Examiner*—Ashok Mannava
*Attorney, Agent, or Firm*—Robert T. Johnson

[57] ABSTRACT

Disclosure is made in this application of a pedestal housing and a pedestal control housing segment mounted at the top of the pedestal housing and a control panel board mounted in the control housing segment and power lines entering the pedestal housing below the ground level and into the pedestal housing and lead connectors extending from sump pump and sump pump float switch and tank alert float switch extending from sump tank through a connector duct or pipe into the pedestal housing and extending to the control panel board in the housing segment and a door mounted on the control housing segment to seal the control housing segment. The lead connectors of the power lines and the float switches extend through apertures in the bottom of the control housing segment and are held in position by grommets to seal the openings around the lead connections. There is a float switch for a full tank alert which is connected to an audible alarm and to an electric light visible alert mounted on the top of the pedestal housing.

6 Claims, 4 Drawing Sheets

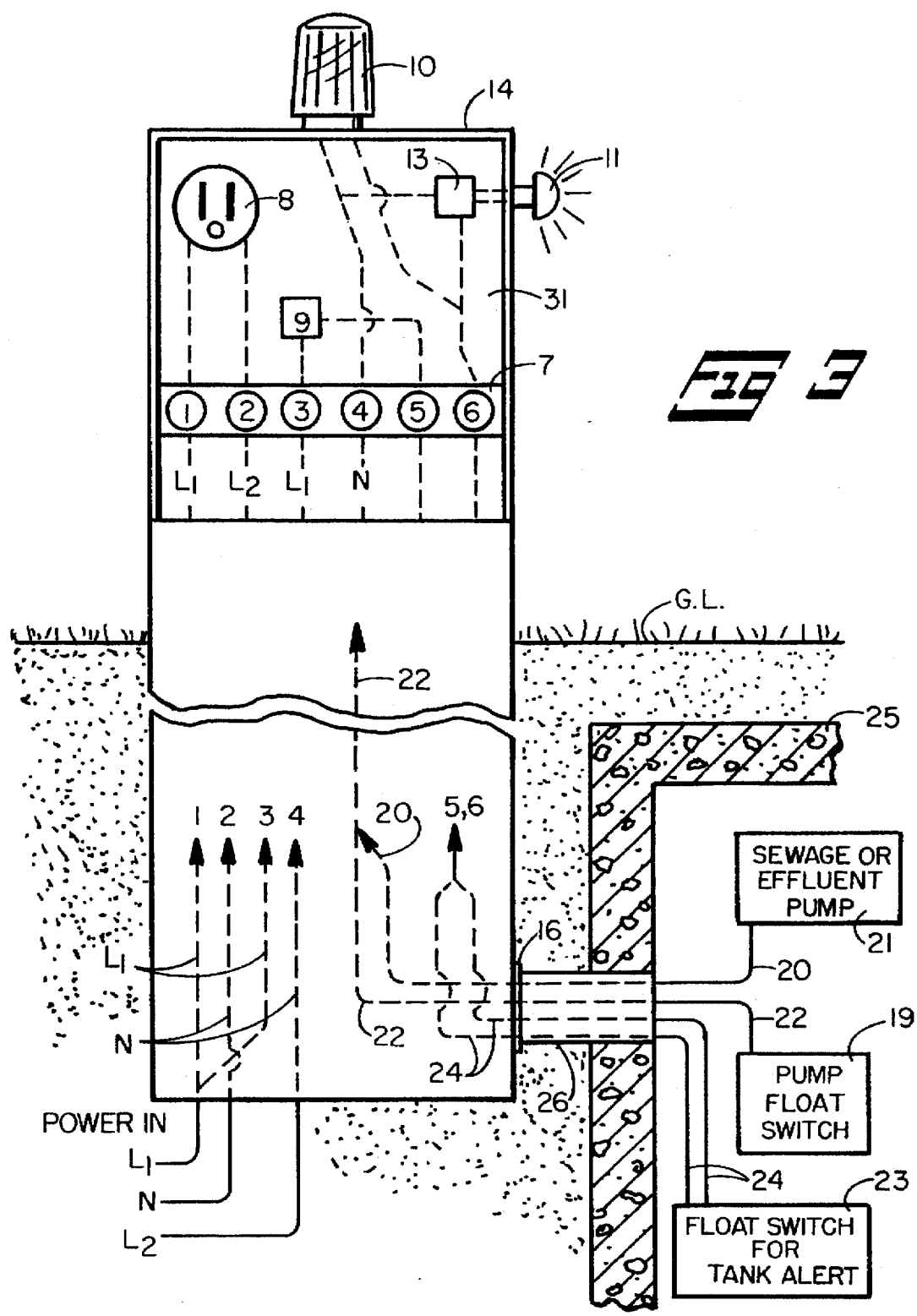

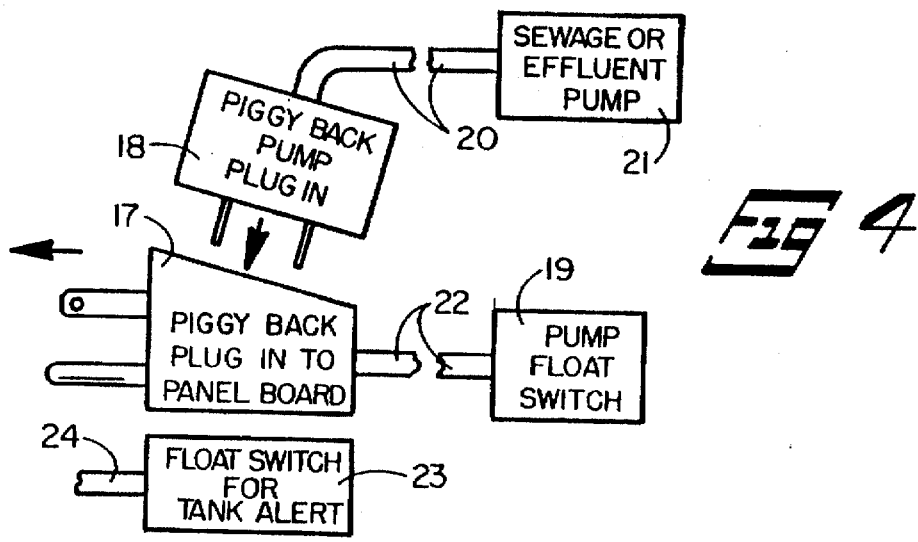
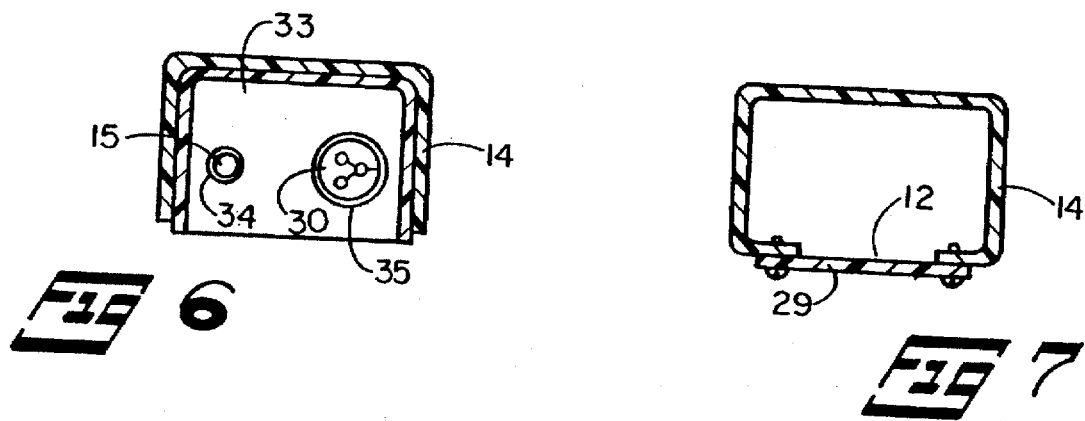
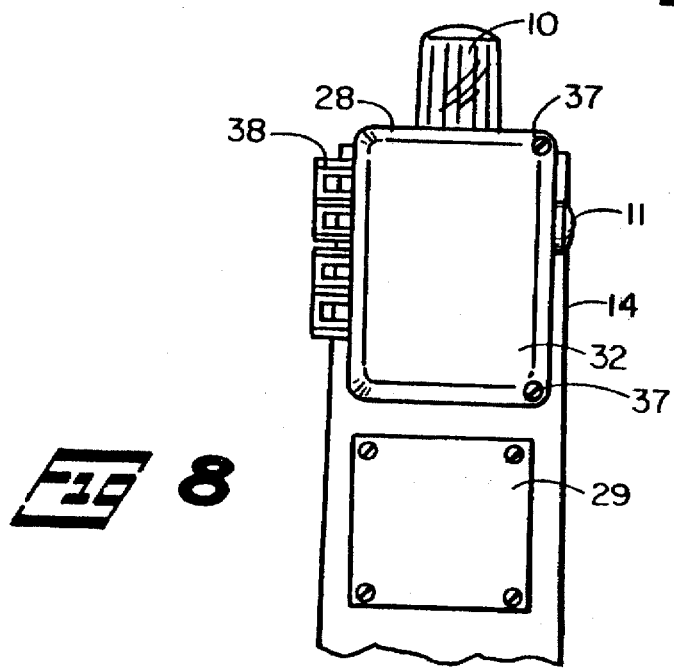

5,696,493

PEDESTAL HOUSING FOR ELECTRIC CONNECTION PANEL FOR SUMP PUMP AND FULL SEPTIC TANK ALARM

This is a continuation-in-part of application Ser. No. 08/433,548, filed May 3, 1995.

SUMMARY OF INVENTION

This invention is to disclose a pedestal housing for power supply to electrical connection panel for sump pump and audible and visual warnings for full sump tank. The sump pump is connected to a pump float switch by means of a piggy-back plug-in to the plug of the pump float switch septic tank and a float switch for full tank alert is connected to the audible horn warning and visual light bulb and an off-on switch for off-on of the horn on full tank alert.

PRIOR ART

U.S. Pat. No. 4,228,427 for MONITOR APPARATUS FOR SUMP PUMPS. Audible or visual warning signals to indicate malfunctioning pump, to actuate fail-safe circuits.

U.S. Pat. No. 4,230,578 for SEWAGE EFFLUENT VOLUME CONTROL AND ALARM ARRANGEMENT. Disclosure is made of float switches in the holding tank.

U.S. Pat. No. 4,369,438 for SUMP PUMP DETECTION AND ALARM. Disclosure is made of high water level and electrical power failure alarm system including radio transmitter when either condition exists.

U.S. Pat. No. 4,922,234 for SEWER ALARM. A buoyant mercury switch is mounted in a sewer pipe and a battery connected to the switch.

U.S. Pat. No. 5,256,834 for JUNCTION CENTER. Disclosure is made in this patent of a junction center main tube connected to the sewer riser and wires extending into and out of the main tube.

U.S. Pat. No. 5,283,569 for FLOAT ACTUATED FLOOD WARNING SYSTEM WITH REMOTE TELEPHONE REPORTING. Disclosure is made of a flood warning system including a stilling well having three vertically spaced apart float switches, a telephone alarm dialer actuated by the float switches.

OBJECTS OF THIS INVENTION

An object of this invention is to disclose a pedestal housing for electrical connections for sump pump actuation by means of a pump float switch plugged into a female electrical receptacle and the sump pump plugged into the float switch plug for a piggy-back connection, and a float switch for tank alert connected in the pedestal housing to a warning horn and a light bulb to turn on at the full tank warning.

Another object of this invention is to disclose and claim a sump pump control apparatus of a pedestal control housing and mounted in the pedestal housing a control panel and, mounted on the control panel an electrical terminal strip having a plurality of electrical connectors mounted on the terminal strip and a female electrical plug mounted on the control panel and the female plug connected to two power supply connectors and a power supply connected to the two power supply connectors mounted on the terminal strip and, a single wire power line connected to the third of the electrical connectors of the electrical terminal strip and this single wire extending through a fifth connector of the electrical connectors of the terminal strip to one contact of switch of float switch for tank alert and another single wire power line connected to a fourth connector of the electrical connectors and extending to a sixth connector and to a second switch contact of said float switch for tank alert and an audible alarm horn mounted in series on the line extending from said fourth connector of the electrical terminal strip to the sixth connector of the terminal strip and to the second switch for tank alert and, an electric light alarm mounted in series on said line extending from said fourth connector to the second contact of the switch for tank alert.

Another object of this invention is to disclose a sump pump control apparatus of a pedestal control housing and mounted in the pedestal housing a control panel wherein further improvement discloses mounting the pedestal housing base in the ground and, connector duct extending from the base of said pedestal housing and into the sump or septic tank and wire lead connectors of sump pump float switch for tank alert and pump float switch extending from said sump tank through the connector duct and into the pedestal housing and wire lead connector of the pump float switch plugged into the female power receptacle in the electrical panel board and the plug of the pump float switch having female piggy back opening for piggy back connection of wire lead connectors from the sump pump plugged into pigg-back plug-in of the pump float switch and, electric power line extending from the bottom of the pedestal housing to the electrical panel board.

Another object of this invention is to disclose a sump pump pedestal control housing of a pedestal control housing having a control panel segment and openings in the bottom of the control panel segment and wire lead connectors from the sump pump, sump pump float switch and float switch for tank alert extending from the connector duct through the openings in the bottom of the control panel segment and the electric power line and wire lead connectors of the sump pump, sump pump float switch and float switch for tank alert extending through the opening in the bottom of the control panel bottom and the electric power lines and lead wire connectors extending through grommets in the openings in the bottom of the control panel segment.

Another object of this invention is to disclose a pedestal control housing segment mounted in the top of the pedestal housing and the control panel board mounted in the pedestal control housing segment and a door mounted on a hinge of the control housing segment and the door firmly closed by locking with screws extending through the door and into threaded inserts in the housing segment.

Another object of this invention is to disclose a sump pump pedestal control housing and a control housing segment formed or molded of a plastic compound chosen from the group consisting of polyester, polyvinyl, polyethylene, polypropylene or polystyrene or derivatives thereof.

BRIEF DESCRIPTION OF DRAWINGS

FIG. 3 Layout for electrical connection panel in pedestal housing.

FIG. 4 Schematic for piggy-back connections of sump pump into pump float switch plug, and full tank alert float switch.

FIG. 6 Plan view of bottom of pedestal control housing segment.

FIG. 7 Plan view of mounting of closure panel over access opening in pedestal.

FIG. 8 Elevational view of pedestal section with door closed over connector panel housing.

LEGENDS OF DRAWINGS

Figure 1:
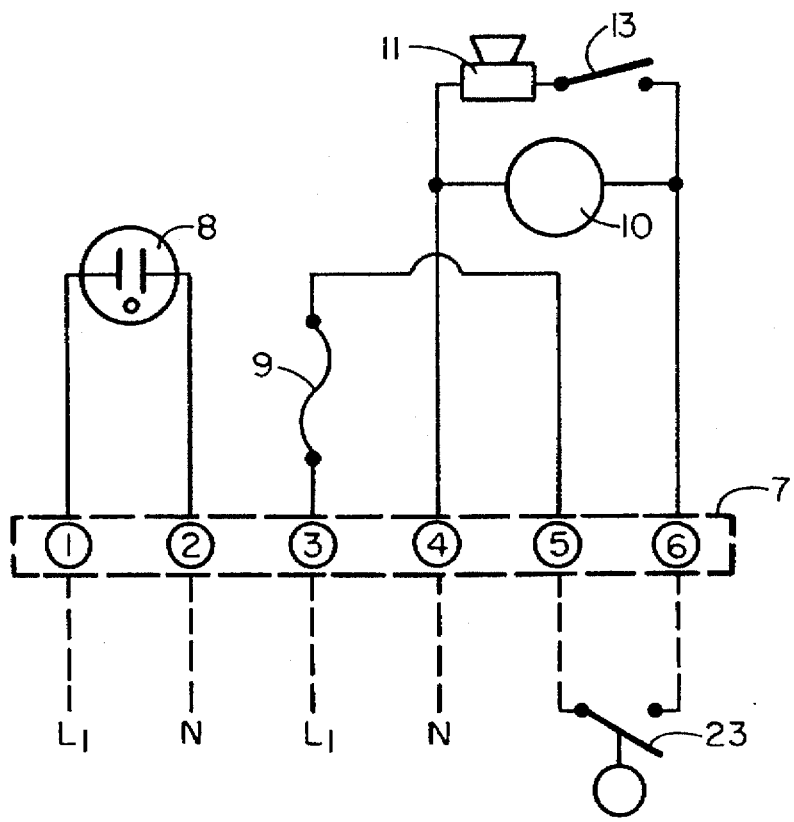
FIG. 1 Schematic for electrical connections for 220 volts (3 wire L1, L2, N).
Figure 2:
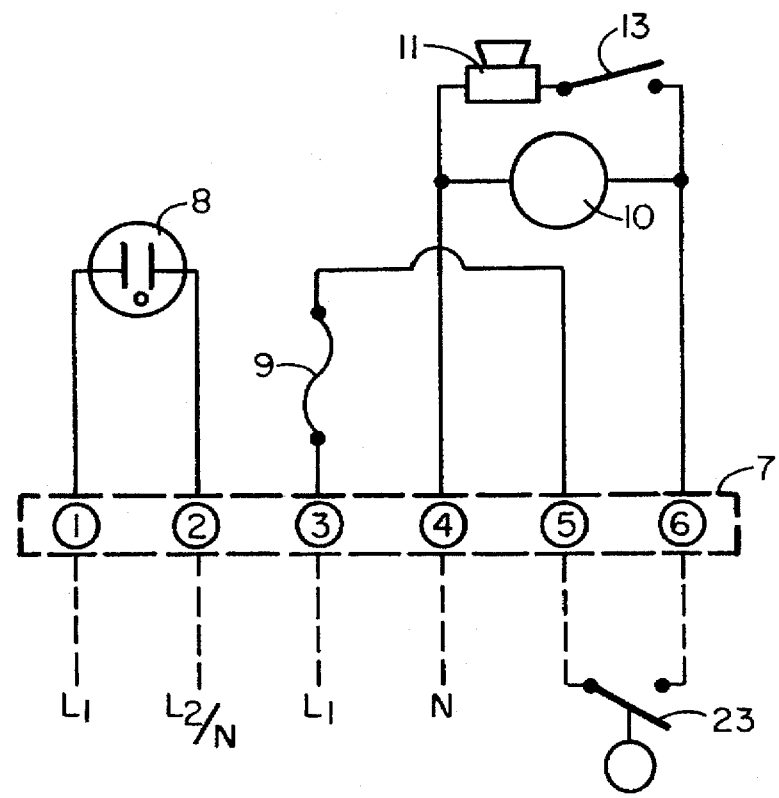
FIG. 2 Schematic for electrical connections for 110 volts.

1—Terminal panel strip connector for power line (L1).
2—Terminal panel strip connector for power line (L2/N).
3—Terminal panel strip connector for power line (L1).
4—Terminal panel strip connector for power line (L1 to tank alert).
5—Terminal panel strip connector for line (N to tank alert).
6—Terminal panel strip connector for power (N to tank alert and audible alarm and warning light).
7—Electrical terminal panel strip connectors.
8—Female power receptacle.
9—Fuse.
10—Electric light visible alarm.
11—Audible horn alarm.
12—Access opening in pedestal.
13—Switch for audible horn alarm shut off.
14—Pedestal housing for terminal connections.
15—Power line grommet.
16—Aperture for connection of pedestal housing to septic tank.
17—Electrical male plug with piggy-back female plug receptacle.
18—Plug from sump pump to plug into piggy-back plug of pump float switch.
19—Sump pump float switch.
20—Electric wire leads from sump pump to piggy-back plug.
21—Sump pump or sewage or effluent pump.
22—Wire lead connections from sump pump float switch to piggy-back plug into female receptacle on panel board.
23—Float switch for tank alert.
24—Wire lead connections from float switch for tank alert to terminal strip and connected to audible horn and electric light warning.
25—Sump or septic tank.
26—Connector duct joining pedestal housing and septic or sump tank.
27—Sump pump effluent pipe.
28—Door on hinge for closing and sealing connector panel housing.
29—Closure panel for access opening in pedestal housing.
30—Grommet for lead connectors of sump pump, full tank alert and sump pump float switch.
31—Control panel board.
32—Pedestal control housing segment.
33—Bottom of pedestal control housing segment.
34, 35—Openings in bottom of pedestal control housing segment.
36—Effluent pipe from sump pump.
37—Screws for locking door of pedestal control housing segment.
38—Door hinge
39, 39'—Threaded inserts.
L1, L2, N—Electric power lines.
GL—Ground surface level

DETAILED DESCRIPTION OF INVENTION

This invention is to disclose a pedestal housing legend 14 (see FIGS. 5, 8) for electrical connections (see FIGS. 1, 2, 3, and 5) for sump pump 21 actuation by means of a pump float switch 19 having piggy-back plug in 17 plugged into the female electrical receptacle 8 and the sump pump plug-in 18 plugged into the pump float switch 17 plug for a piggy-back connection, and a float switch for tank alert 23 connected in the pedestal housing 8 to an audible horn alarm 11 and an electric light alarm 10 bulb to turn on at the full tank warning.

Further disclosure of this invention includes a pedestal control housing segment 32, mounted in pedestal housing 14 a sump pump control apparatus of a pedestal control housing 14 and mounted in the pedestal housing 14 a control housing segment 32 and a control panel 31 mounted in the control housing segment 32 and, mounted on the control panel an electrical terminal strip 7 (see FIGS. 1, 2, 3, 4) having a plurality of electrical or circuit connectors 1, 2, 3, 4, 5, and 6 mounted on the terminal strip 7 and a female electrical plug receptacle 8 mounted on the control panel 31 and the female plug or power receptacle 8 connected to power supply connectors L1, L2 and N for 220 volt installation or L1 and N connections for 110 volt installation (see FIGS. 1 and 2) and a power supply connected to terminal panel strip connectors 1 and 2 (see FIGS. 1 and 2) the two power supply connectors mounted on the terminal strip 7 and, a single wire power line L1 connected to the number 3 of the electrical connectors of the electrical terminal strip 7 and this single wire L1 extending through the number 5 connector of the electrical connectors of the terminal strip 7 to one contact of float switch 23 for tank alert 23 and another single wire power line connected to a number 4 connector of the electrical connectors and extending to number 6 connector and to a second switch contact of the float switch 23 for tank alert and an audible alarm horn 11 mounted in series on the line extending from the number 4 connector of the electrical terminal strip 7 to the number 6 connector of the terminal strip 7 and to the second switch contact for tank alert 23 and, an electric light visible alarm 10 mounted in parallel to the audible horn alarm 11 on the line extending from the number 4 connector to the second contact of the switch for tank alert 23.

This invention further discloses a sump pump control apparatus of a pedestal housing 14 for terminal connections and mounted in the pedestal housing is a control panel 31 and mounting the pedestal housing 14 base in the ground (see FIGS. 3 and 4) and, connector duct 26 (see FIGS. 3, 4) extending from the base of the pedestal housing 14 and into the sump or septic tank 25 and wire lead connectors 22 of sump pump float switch 19 and lead connectors 24 for float switch for tank alert 23 and lead connectors 20 for sump pump 21 extending from the sump tank 25 through the connector duct 26 and into the pedestal housing 14 and wire lead connector 22 of the pump float switch 19 plugged into the female power receptacle 8 in the electrical control panel board 31 and the piggy-back plug 17 of the pump float switch 19 having a female piggy-back opening for piggy back connection of wire lead connectors from the sump pump 21 plugged into pigg-back plug-in of the pump float switch 19 and, electric power line L1, L2, N extending from the bottom of the pedestal housing to the electrical control panel board 31.

This invention further discloses a pedestal housing 14 for sump pump pedestal control housing segment 32 and the pedestal control housing segment 32 having a control panel board 31 and openings in the bottom 33 of the pedestal control housing segment 32 and a control panel board 31 mounted in the pedestal control housing segment 32 and wire lead connectors 20, 22, and 24 from the sump pump 21, sump pump float switch 19 and float switch for tank alert 24 respectively extending from the connector duct 26 through openings 34, 35 in the bottom of the pedestal control housing segment 32 and the electric power line L1, L2, and N extending through a suitable power line grommet 15 in the opening 34 in the bottom of pedestal control housing segment 32 and wire lead connectors of the sump pump 21, sump pump float switch 19 and float switch for tank alert 23 extending through the opening 35 in the bottom of pedestal control housing segment 33 and the electric power lines L1,L2, and N extending through power line grommet 15 in opening 34 in the bottom of pedestal control housing segment and lead wire connectors 20, 22, and 24 extending through grommet 30 in the opening in the bottom of pedestal control housing segment 35.

A fuse 9 is mounted in series in line L1 extending to float switch for tank alert 23, and a switch 13 for audible alarm shut off is mounted in series with the horn audible alarm 11.

To more fully describe the pedestal housing 14, there is mounted in the top portion of the pedestal housing 14 a pedestal control housing segment 32, and a door 28 mounted on a hinge for closing and sealing the control panel board in the housing segment. Mounted in the pedestal housing 14 is an access opening 12 (see FIG. 7), to aid in pushing the various line connectors 20, 22, and 24 and power lines L1, L2 and N entering from the bottom of the pedestal housing up through the bottom 33 of pedestal control housing segment for mounting in grommets 30 and 15 (see FIG. 6). On assembly of the pedestal housing components closure panel 29 for access opening 12 is attached to seal this opening 12.

Figure 5:
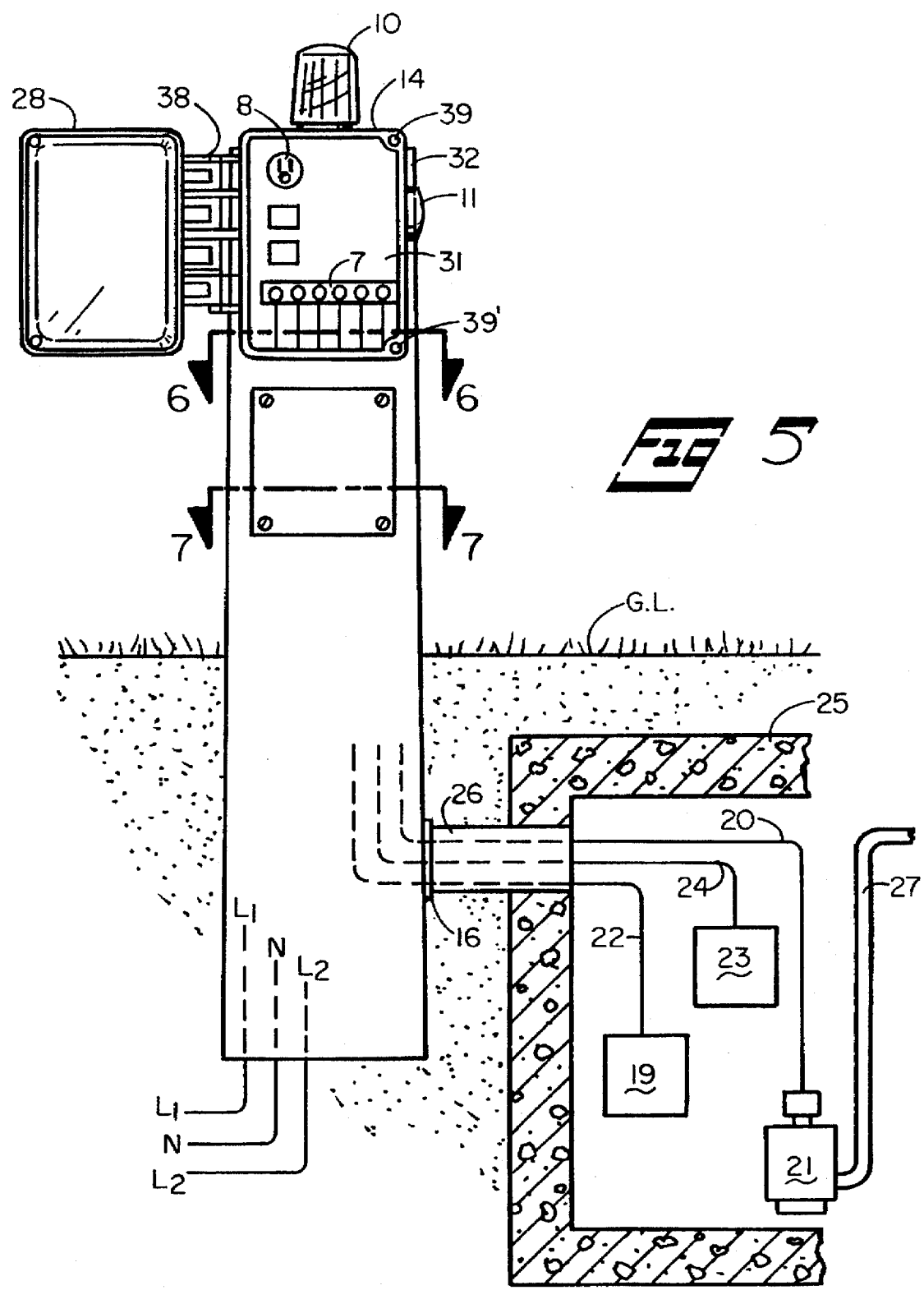
FIG. 5 Elevational view of sump assembly and pedestal control panel mount.

To allow for entry of connector duct 26 into the pedestal housing 14, at the base of the pedestal housing which is preferably below ground level G L (see FIGS. 3, 5) there is an aperture 16 for connection with connector duct 26 which extends into sump or septic tank 25 (see FIGS. 3, 5).

The sump pump effluent pipe 27 extends from the sump pump 21 to convey the effluent to the desired location.

The pedestal control housing segment 32 is mounted in the top of the pedestal housing 14 and the control panel board 31 mounted in the pedestal control housing 32 segment and a door 28 mounted on a hinge 38 of the control housing segment 32 and the door 28 firmly closed by locking with screws extending through the door and into threaded inserts 39, 39' in the housing segment 32.

The sump pump pedestal control housing 14, control housing segment 32 and control panel board 31 are formed or molded of a plastic compound selected from the group consisting of polyurethane polyester, polyvinyl, polyethylene, polypropylene or polystyrene or derivatives thereof.

Having described my invention I claim:

1. A sump pump control apparatus comprising a pedestal control housing and mounted in said pedestal housing a control panel and,
    a. mounted on said control panel an electrical terminal strip having a plurality of electrical connectors mounted on said terminal strip and
    b. a female electrical plug mounted on said control panel and said female plug connected to two power supply connectors and
    c. a power supply connected to said two power supply connectors mounted on said terminal strip and,
    d. a single wire power line connected to a third of said electrical connectors of said electrical terminal strip and this said single wire extending through a fifth connector of said electrical connectors of said terminal strip to one contact of a float switch for tank alert and
    e. another single wire power line connected to a fourth connector of said electrical connectors and extending to a sixth connector and to a second switch contact of said float switch for tank alert and
    f. an audible alarm mounted in series on said line extending from said fourth connector of said electrical terminal strip to the sixth connector of said terminal strip and to said second switch for tank alert and,
    g. an electric light alarm mounted in parallel on said line extending from said fourth connector to said second contact of said switch for tank alert.

2. A sump pump control apparatus of claim 1, comprising said pedestal control housing and mounted in said pedestal housing a control panel of wherein a further improvement comprises,
    a. mounting said pedestal housing base in the ground and,
    b. connector duct extending from base of said pedestal housing and into said sump or septic tank and
    c. wire lead connectors of sump pump float switch for tank alert and pump float switch extending from said sump tank through said connector duct and into said pedestal housing and
    d. wire lead connector of said pump float switch plugged into said female power receptacle in said electrical panel board and
    e. said plug of said pump float switch having female piggy back opening for piggy back connection of wire lead connectors from said sump pump plugged into piggback plug-in of said pump float switch and,
    f. electric power line extending from the bottom of said pedestal housing to said electrical panel board.

3. Sump pump pedestal control housing of claim 1, wherein the improvement comprises,
    a. said pedestal control housing comprising a control panel segment and openings in the bottom of said control panel segment and wire lead connectors from said sump pump, sump pump float switch and float switch for tank alert extending from said connector duct through said openings in said bottom of said control panel segment and
    b. said electric power line and wire lead connectors of said sump pump, sump pump float switch and float switch for tank alert extending through said opening in said bottom of said control panel bottom and
    c. said electric power lines and lead wire connectors extending through grommets in said openings in said bottom of said control panel segment.

4. A sump pump pedestal control housing of claim 1, wherein the improvement comprises,
    a. said pedestal housing and mounted in the top portion of said pedestal a pedestal control housing segment and a door mounted on a hinge for closing and sealing said control housing segment and a panel board in said housing segment and,
    b. mounted in said pedestal housing an access opening and
    c. access opening panel cover and
    d. power lines and lead connectors extending upwards in said pedestal housing and through apertures in bottom of said control housing segment and
    d. said power lines and lead connectors extending through grommets mounted in said apertures in bottom of said housing segment and
    e. base of said pedestal housing mounted below ground level and a connector duct joining said pedestal and sump tank, and said connector duct extending into said pedestal through an aperture in said pedestal housing and f. an effluent pipe extending from said sump pump.

5. A pedestal control housing segment of claim 4 wherein the improvement comprises mounting said control housing segment in the top of said pedestal housing and said control panel board mounted in said pedestal control housing segment and said door mounted on a hinge of said control housing segment and said door firmly closed by locking with screws extending through said door and into threaded inserts in said housing segment.

6. A sump pump pedestal control housing and control housing segment and control panel board of claims 1 or 4 formed or molded of a plastic compound selected from the group consisting of polyester, polyurethane, polyvinyl, polyethylene, polypropylene or polystyrene or derivatives thereof.

* * * * *